Jan. 6, 1970  M. MUELLER  3,487,622
APPARATUS FOR CAPPING CONTAINERS
Original Filed July 22, 1963  6 Sheets-Sheet 1

Inventor
Martin Mueller
Dressler, Goldsmith, Clement
& Gordon
Attorneys

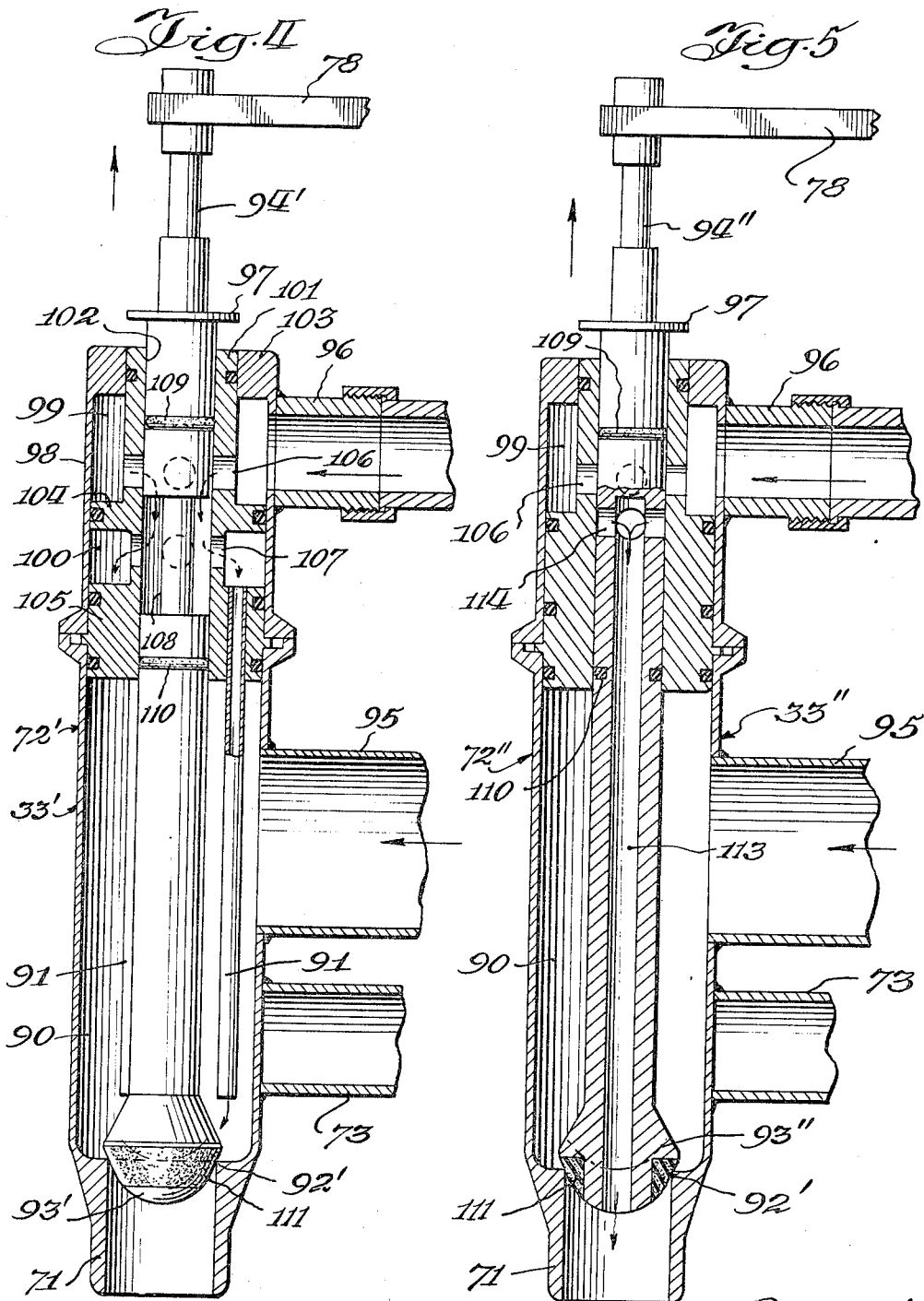

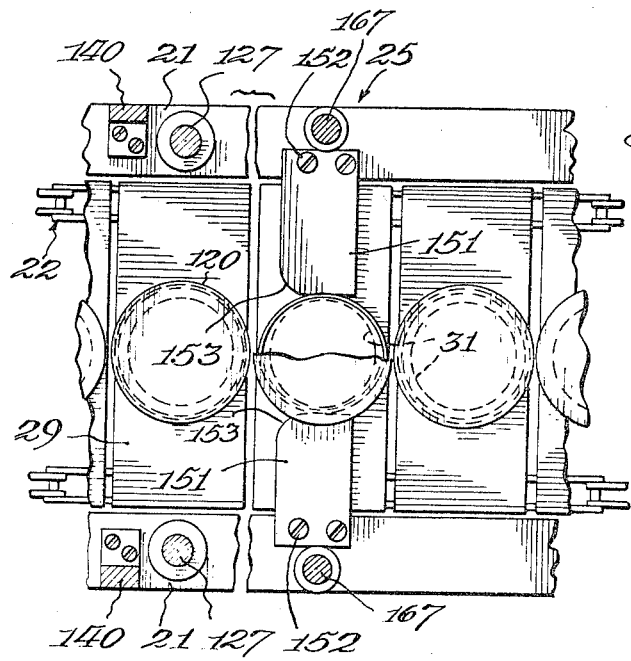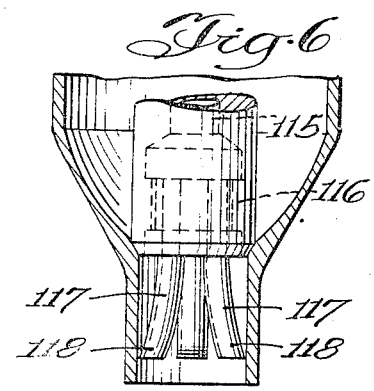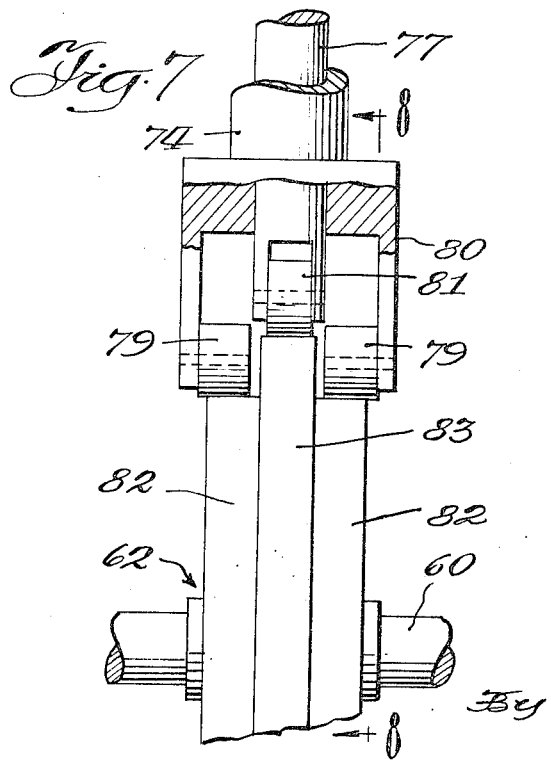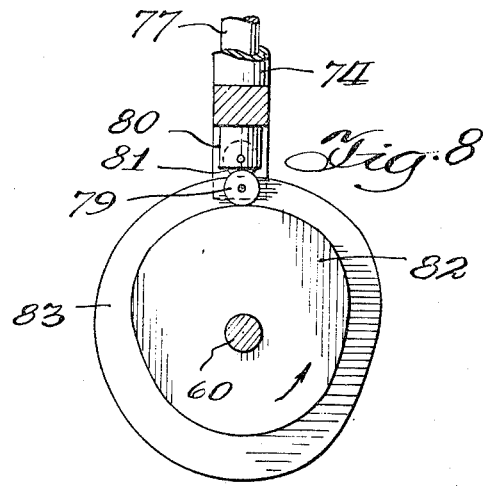

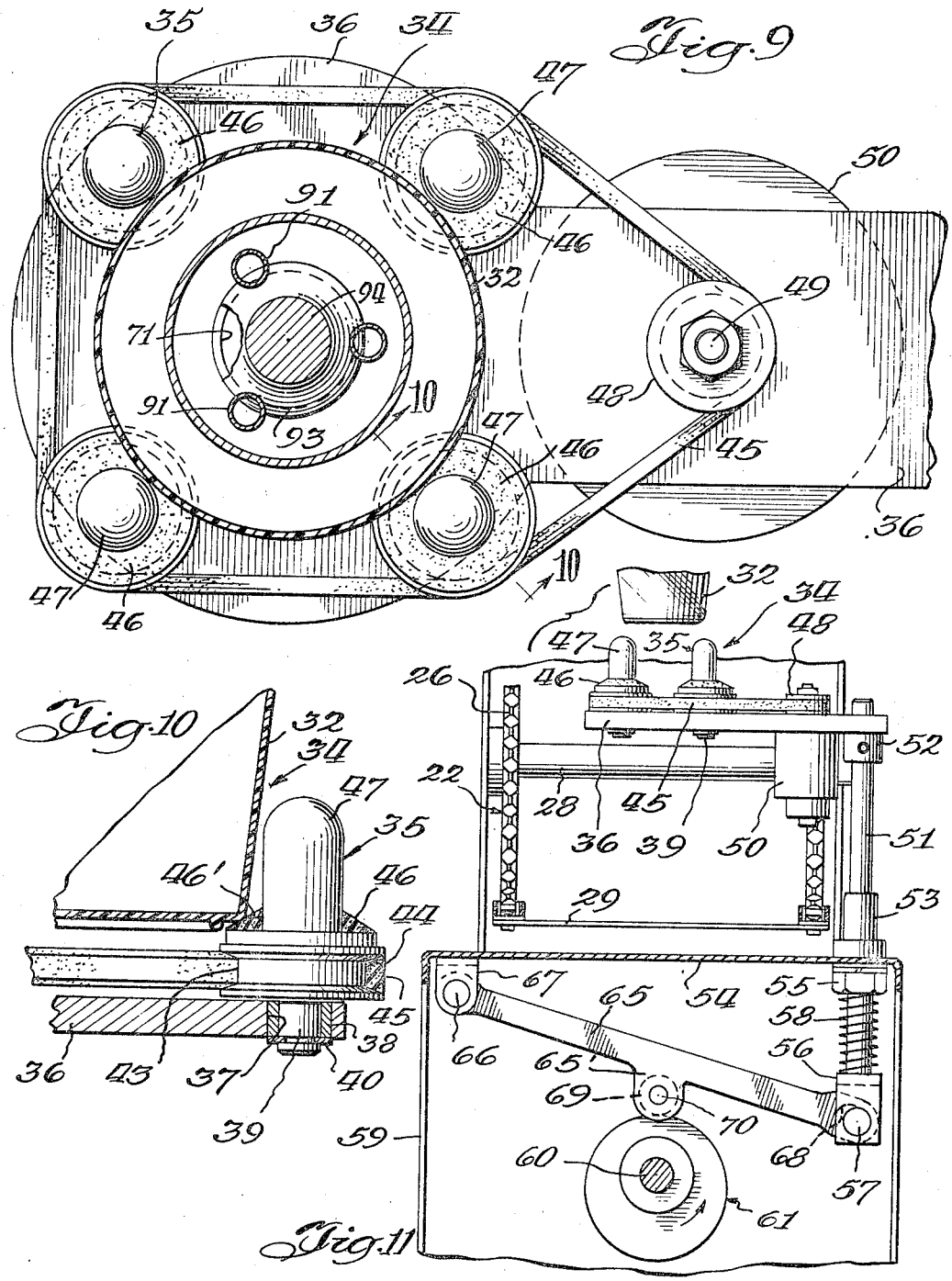

Jan. 6, 1970  M. MUELLER  3,487,622
APPARATUS FOR CAPPING CONTAINERS
Original Filed July 22, 1963  6 Sheets-Sheet 5
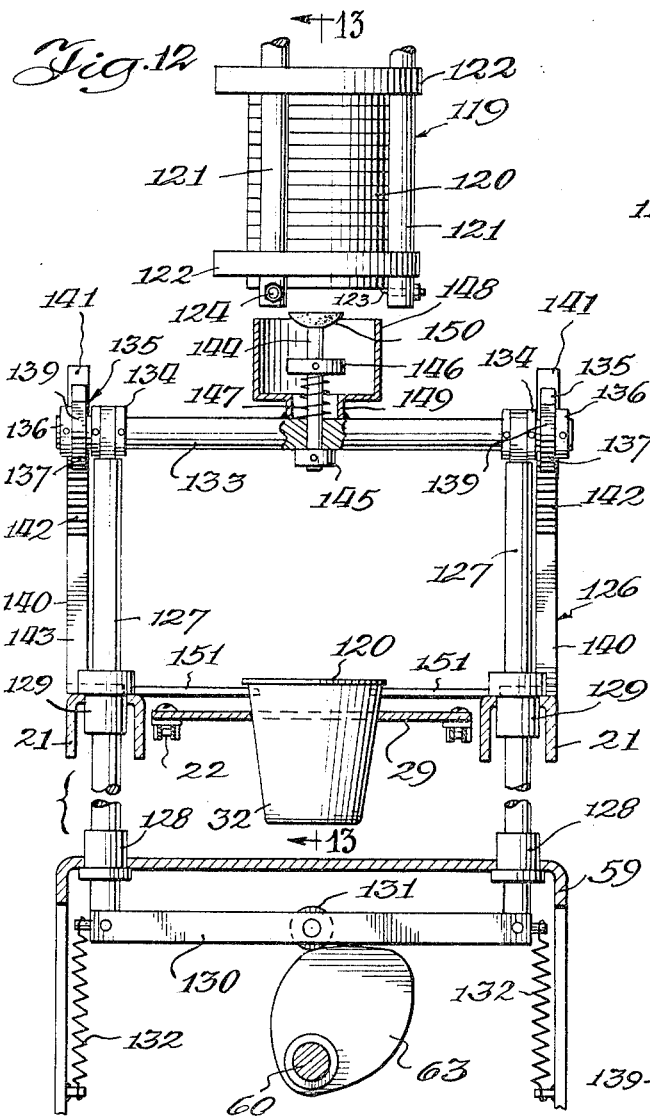
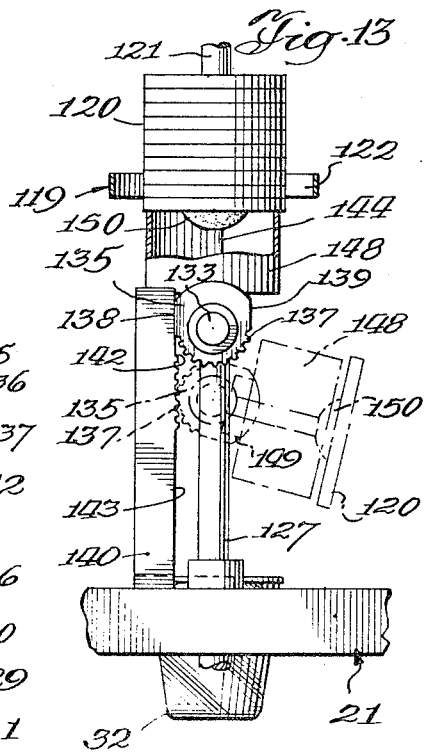
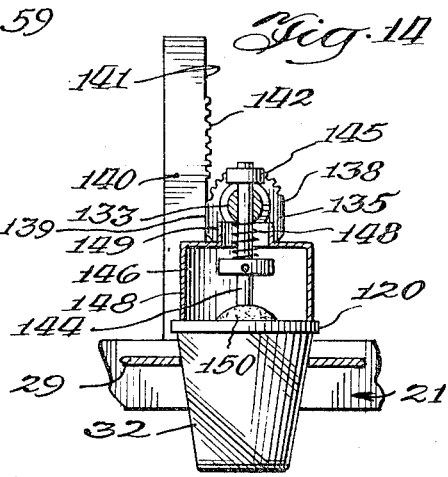
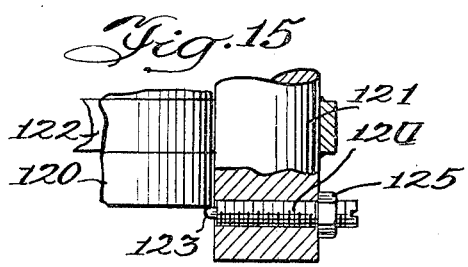
Inventor
Martin Mueller
Dressler, Goldsmith, Clement,
& Gordon
By Attorneys

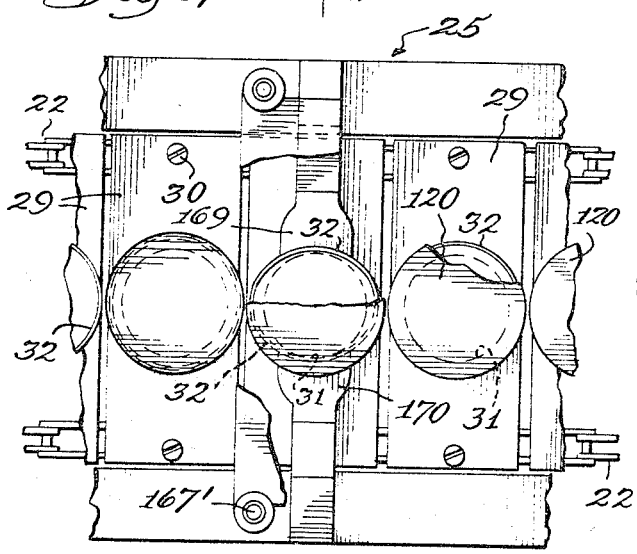
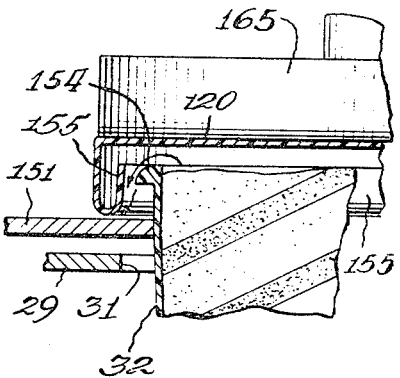
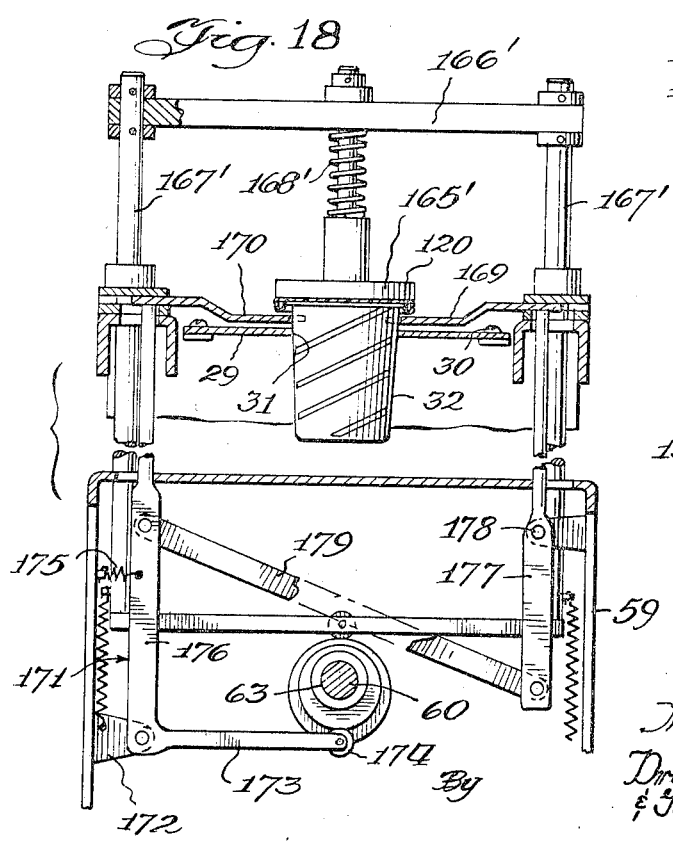
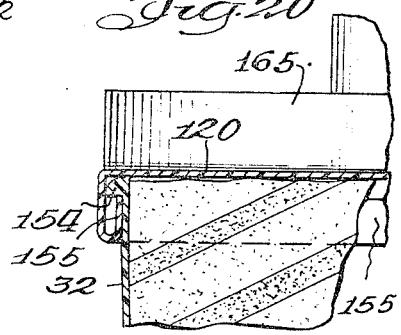
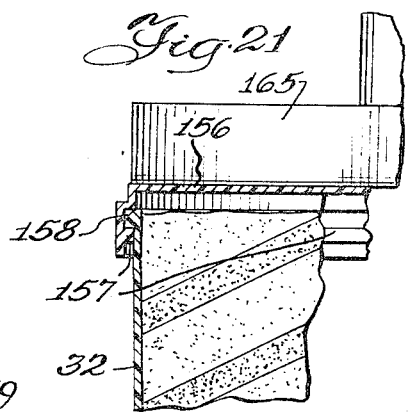

United States Patent Office 3,487,622
Patented Jan. 6, 1970

3,487,622
APPARATUS FOR CAPPING CONTAINERS
Martin Mueller, Chicago, Ill., assignor, by direct and mesne assignments, to Owens-Illinois, Inc., Toledo, Ohio, a corporation of Ohio
Continuation of application Ser. No. 560,754, June 27, 1966, which is a division of application Ser. No. 296,563, July 22, 1963, now Patent No. 3,267,971, dated Aug. 23, 1966. This application Dec. 19, 1967, Ser. No. 691,730
Int. Cl. B65b *1/00, 3/00, 5/00*
U.S. Cl. 53—282         5 Claims

ABSTRACT OF THE DISCLOSURE

This invention is directed to apparatus for applying a cover to a container so as to provide an air-free sealed package. After the container is substantially filled with a pressure-flowable food product, the air located between the upper surface of the food product is substantially removed before the product is covered. This is done by pressing a cover onto the container while compressing the side of the container to force out the air entrapped between the cover of the container and the food product contained therein. The apparatus includes plate means engageable with the container for laterally deflecting the container sidewall and a plunger which acts against the cover to force out the air.

---

This application is a continuation of my copending application No. 560,754, filed June 27, 1966, which in turn is a division of application No. 296,563 filed July 22, 1963, now U.S. Patent No. 3,267,971.

This invention relates to a packaging apparatus and process, and is particularly concerned with a means and a process for mechanically packaging flowable material of two different colors in a cylindrical, conical or frusto-conical transparent container in such a manner as to produce a spiral effect visible through the outside of the container.

While the apparatus is capable of packaging different types of products, it is particularly designed for packaging pressure flowable food products, such as, for example, ice cream, sherbet and the like, and, for convenience, the invention will be described with reference to ice cream and syrup.

Packages containing ice cream with syrup or other flavoring material arranged to form a spiral design around the outer surface of the ice cream are not new, but heretofore such packages have been produced only when the materials are packed by hand. In hand packing, a composite downflowing stream of ice cream and syrup is maintained in a steady flow while successive packages are inserted into the stream and twisted during the filling process. Packing in this manner is relatively slow and requires the constant attention of an operator of skill and agility. It is therefore much more costly than the packing of containers without the spiral effect.

The apparatus of the present invention enables the manufacturer to package ice cream with the desired spiral effect much more rapidly and efficiently and at substantially the same price as ice cream without the spiral effect. The apparatus also includes means for applying a cover to the container in such a manner as to provide an air-free sealed package. The removal of air from under the cover of the container permits the container to be fully packed without any unsightly bulging which could impair the esthetic appeal of the package and which would also make it harder to pack the sealed packages in a carton or a freezer.

The structure by means of which the above mentioned and other advantages of the invention are attained will be fully described in the following specification, taken in conjunction with the accompanying drawings showing a preferred illustrative embodiment of the invention, in which:

FIG. 4 is a vertical sectional view of a preferred embodiment of the discharge nozzle;

FIG. 5 is a vertical sectional view of another preferred embodiment of the discharge nozzle;

FIG. 6 is a fragmentary view, partly in section and partly in elevation, showing another preferred embodiment of the discharge nozzle;

FIG. 7 is a fragmentary side elevational view of the cam mechanism for operating the discharge nozzle;

FIG. 8 is a vertical sectional view, taken along the line 8—8 of FIG. 7;

FIG. 9 is a cross sectional view, taken generally along the line 9—9 of FIG. 1, but with the discharge nozzle within the container at the start of the container filling operation;

FIG. 10 is across sectional view, taken along the line 10—10 of FIG. 9;

FIG. 11 is a vertical sectional view, taken along the line 11—11 of FIG. 1;

FIG. 12 is a fragmentary vertical view, partly in elevation and partly in section, showing the cover applying mechanism;

FIG. 13 is a fragmentary vertical view, partly in elevation and partly in section, taken generally along the line 13—13 of FIG. 12, and showing the cover applying mechanism in its uppermost position in solid lines and in an intermediate position in dotted lines;

FIG. 14 is a view of the mechanism shown in FIG. 13, except that the mechanism is in its lowermost position;

FIG. 15 is a fragmentary detail view, partly in elevation, showing the adjustable means for holding a stack of covers in a receptacle before they are applied to the filled containers;

FIG. 16 is a fragmentary top elevational view showing the mechanism for freeing the container of entrapped air before the cover is secured in place;

FIG. 17 is a view similar to FIG. 16, showing another embodiment of the mechanism shown in FIG. 16;

FIG. 18 is a fragmentary vertical sectional view taken along the line 18—18 of FIG. 17;

FIG. 19 is a diagrammatic view showing how entrapped air is released from the container before the cover is secured in place;

FIG. 20 is a diagrammatic view showing the cover of FIG. 19 secured to the container; and FIG. 21 is a view, similar to FIG. 20, showing a different form of cover.

Figure 1:
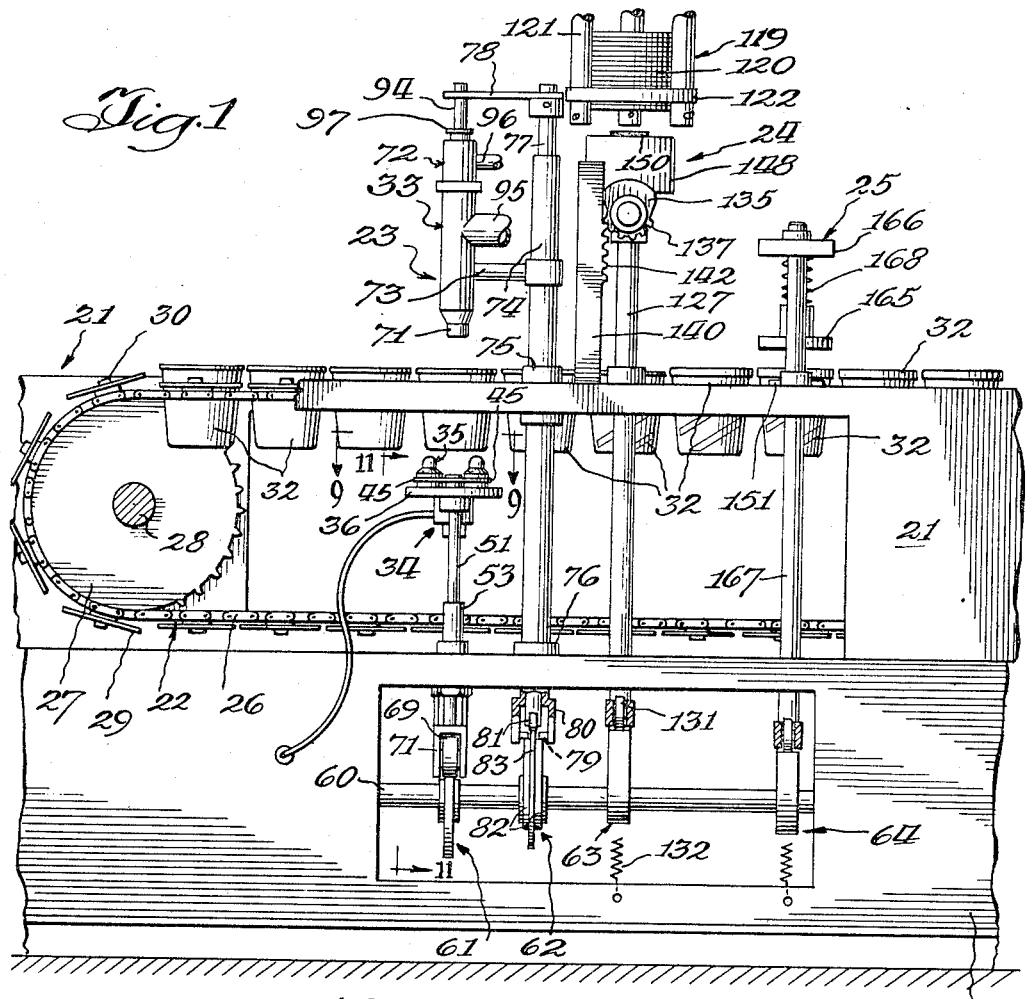
FIG. 1 is a fragmentary side elevational view of the apparatus embodying the invention.

Referring to the drawings, the apparatus comprises a suitable frame 21, an endless conveyor 22, a filling station 23, a cover applying station 24, and a sealing station 25. The conveyor comprises a pair of laterally spaced endless chains 26 each of which extends around a pair of sprockets 27 at opposite ends of the frame. The sprockets at each end are mounted on a rotatable shaft 28, one of the shafts being driven by a motor (not shown). A series of flat plates 29 secured at opposite edges to chains 26, as indicated at 30, each have a centrally disposed opening 31 for receiving a transparent or translucent container 32. A container is manually positioned in each opening 31, but automatic means may be provided for this purpose. The container is preferably of frusto-conical shape, and the opening 31 has a diameter slightly smaller than the diameter of the top portion of the container, so that the container is supported just below its upper edge, as shown in FIG. 18.

Although the apparatus shown in the drawings has means for supporting only one row of containers, it will be understood that the chains may be spaced any desired distance from each other, and each plate 29 may be provided with a plurality of openings for holding a plurality of rows of containers. The containers of each row would then be filled simultaneously. Cylindrical containers may be used in the same apparatus if they have a lateral flange adjacent the upper edge. If the containers to be filled are cylindrical, and do not have any lateral flange, they may be supported by inturned fingers depending from plates 29.

The conveyor is moved intermittently by any suitable means (not shown), and is stopped each time one of the plates 29 reaches the filling station with the open top of the container carried thereby positioned beneath the discharge nozzle 33. The movent of the conveyor is so timed that each container beneath the discharge nozzle is filled before the conveyor resumes its movement. A spinning mechanism 34 in vertical alignment with the discharge nozzle is located beneath the container when the container is being filled.

The spinning mechanism, as shown in FIGS. 9 to 11, comprises a plurality of spindles 35 rotatably mounted in a flat horizontally disposed plate 36 having an aperture 37 for receiving each spindle. Although the number of spindles may be varied, the preferred embodiment has four. The apertures in plate 36 are spaced equidistant from a common center and each aperture is provided with a bushing 38 in which the shank 39 of the spindle fits. The shank 39 is held in the bushing by a C-spring 40. The intermediate section of the spindle has a circumferential recess 43 with beveled edges 44 for a frictional fit with an endless belt 45. The spindle also has a beveled surface 46 above the recess, for frictional engagement with the lower edge of the container 32. Preferably the surface 46 is formed by a ring 46' of rubber or other similar resilient material that is fitted over the spindle 35. As shown in FIG. 10, the ring 46' has a triangular cross section.

The apertures 37 are so spaced that the center to center distance between diagonally opposite apertures is sightly greater than the diameter of the bottom of the container. The intermediate section of each spindle extends laterally beyond the circumference of its aperture to such an extent that the distance between the adjacent edges of diagonally opposite spindles is less than the diameter of the bottom of the contaner, and the beveled surfaces 46 of each spindle engage the lower edge of the container when the plate 36 is raised, as hereinafter described. The upper portion of the spindle is in the form of an upright projection 47 spaced slightly from the upright wall of the container 32 to prevent displacement of the container as it is spun around its own vertical axis by the frictional engagement of its lower edge with the four spindles that are rotated constantly by the endless belt 45.

The belt 45, which frictionally engages the circumferential recess of each spindle, is driven by a pulley 48 which is fixed to the output shaft 49 of a motor 50. The motor is preferably an air motor, but any suitable motor may be used. The motor 50 is mounted on the bottom of plate 36 in any suitable manner with its output shaft 49 projecting through said plate for driving engagement with the endless belt 45.

The plate 36 is fixed at one end to a vertical shaft 51 by means of a collar 52. The shaft 51 is slidably mounted in a bushing 53 that extends through a flat plate 54 and is secured thereto by a nut 55. An inverted channel member 56 mounted on the lower end of the vertical shaft 51 carries a transverse pin 57 for a purpose hereinafter disclosed. A coiled compression spring 58 encircling shaft 51 between the nut 55 and the top of channel member 56 urges shaft 51 downwardly. The plate 54, through which the shaft 51 extends, forms the top of a housing 59 that encloses a main drive shaft 60. The shaft 60 is driven continuously by a motor (not shown) to rotate a series of cams 61, 62, 63 and 64 mounted on the shaft in axially spaced relationship.

The vertical movement of shaft 51 is the upward didection is controlled by a lever 65 that is pivotally secured at one end to a pin 66 mounted in a bracket 67 mounted on the underside of plate 54. The opposite end of the lever has an elongated slot 68 through which the pin 57 extends. A cam follower roller 69 is rotatably mounted on a pin 70 fixed to a pair of ears 65' extending downwardly from the lever 65 at approximately its midsection. The spring 58 urges the cam roller 69 downwardly into peripheral surface engagement with the cam 61. As the cam 61 rotates, its thick section forces the lever 65 upwardly about its fixed pivot 66 to raise the shaft 51 and plate 36 against the force of the spring 58. The spring 58 forces the shaft 51 downwardly as the rotation of the cam moves its thin section between the shaft 60 on the cam roller 69. The cam 61 is set to provide a predetermined timing relationship between the vertical movement of the spinner mechanism and the feeding mechanism.

As the spinning mechanism is moved upwardly, the beveled surfaces 46 of all of the spindles 35 engage the lower edge of the container and spin it rapidly. The upright projections 47 of the spindles are so close to the upstanding wall of the container 32 that they restrict the lateral movement of the container to a distance less than the lateral overlap between the outer edge of the container and the periphery of the base of the beveled surface 46. The spatial relationship between the spindles and the vertical axis of the container insures continuous frictional engagement between the beveled surface 46 of each of the spindles and the lower edge of the container whenever the spinning mechanism is raised high enough for such engagement.

As the shaft 51 is raised, the spinning mechanism raises the container until the bottom of the empty container is in proximity to the outlet 71 at the lower end of the discharge nozzle 33. The operation of the apparatus is so timed that the nozzle is closed when the spinning mechanism is in its uppermost position. By means of mechanism hereinafter described, the nozzle 33 is opened to dispense the food products into the container at the same time as the spinning mechanism starts moving downwardly. As previously stated, the spring 58 forces the spinning mechanism downwards. The weight of the container and the food products dispensed into it force the container downwardly to keep it in contact with the spinning mechanism as the spinning mechanism is moved downwardly, thus insuring continuous spinning of the container as it is being filled. When the container is completely filled, the discharge nozzle is closed.

The diameter of the aperture 31 in plate 29 is smaller than the diameter of the container at its upper edge portion. Accordingly, the container stops moving downwardly when its peripheral surface engages the edge of the plate 29 defining the aperture 31. At this point the upper edge of the container is lower than the bottom of the nozzle 71. The spinning mechanism continues its downward movement until it reaches its lowermost position. At this point the thinnest portion of the cam 61 is between the cam roller 69 and the shaft 60. As soon as the spindles 35 of the spinning mechanism move downwardly far enough to clear the bottom of the container, the conveyor starts to move the containers toward the discharge end of the conveyor. The movement of the conveyor is timed so that the most recently filled container reaches the cover applying station 24, and the next container reaches the filling station 23 in vertical alignment with the spinning mechanism before the spinning mechanism moves upwardly far enough to engage the bottom of said next container.

The discharge nozzle 33 comprises a housing 72 connected by means of a bracket 73 to a vertically reciprocable sleeve 74 slidably mounted in axially spaced bushings 75 and 76. A rod 77, slidably mounted in the sleeve 74, has a cross bar 78 secured to its upper end. The other end of the cross bar is operatively connected to a plunger structure, hereinafter described, for controlling the operation of the nozzle 33. As shown in FIGS. 7 and 8, a pair of cam rollers 79 are rotatably mounted in a bifurcated bracket 80 depending from the lower end of the sleeve 74. A cam roller 81 is rotatably mounted in the lower end of the rod 77.

The cam rollers 79 and 81 are engaged with the cam 62, which is a double acting cam comprising a pair of identical cam plates 82 fixed to the drive shaft 60 adjacent opposite sides of a central cam plate 83. The cam plates 82 are each in vertical alignment with one of the cam rollers 79, and the cam plate 83, which is also fixed to shaft 60, is in vertical alignment with the cam roller 81. The cam roller 81 is moved upwardly by the cam plate 83 to raise the cross bar 78. The cross bar 78 and the plunger structure connected thereto may be moved downwardly by gravity, following the configuration by the periphery of the cam plate 83, but a spring mechanism, such as that shown in FIG. 11, may be provided, if necessary to insure downward movement of the cross bar and its associated plunger structure.

The cam rollers 79 move the sleeve 74 upwardly as they are moved upwardly by the configuration of the peripheries of cam plates 82. The cam plates 82 are shaped to provide an abrupt rise in the movement of sleeve 74 substantially simultaneously with the termination of the downward movement of the cross bar 78. The significance of the timed relationship between the abrupt upward movement of the sleeve 74 and the completion of the downward movement of the cross bar 78 will be discussed later in connection with the description of the specific operation of the discharge nozzle 33.

Figure 2:
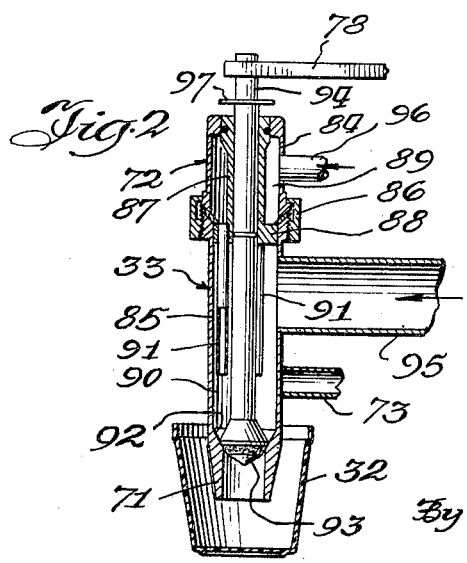
FIG. 2 is a vertical sectional view showing one embodiment of the dispenser or discharge nozzle.
Figure 3:
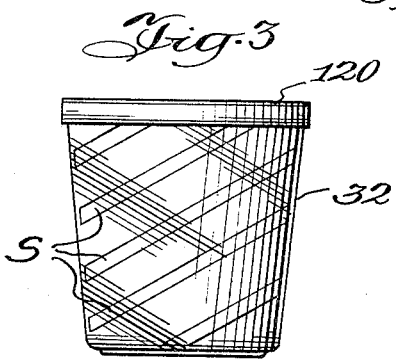
FIG. 3 is a detail perspective view of a package produced by the apparatus.

In the simplest form of the discharge nozzle 33, as shown in FIG. 2, the housing 72 comprises an upper section 84 and a lower section 85 secured in axial alignment by a threaded collar 86. A cylindrical tube 87 depending from the top of section 84 has an annular flange 88 engaging the inner wall surface of the housing to divide the annular space between the tube 87 and the inner wall surface of the housing into an upper chamber 89 and a lower chamber 90. A plurality of narrow conduits 91 extend through the flange 88 to allow one food product, such as syrup, to pass from the upper chamber to the lower chamber for discharge through the discharge outlet 71 simultaneously with the discharge of a different food product, such as ice cream, from the lower chamber into a container 32. In FIG. 9 three conduits are shown, but it will be understood that any desired number of such conduits may be provided. The rapid spinning of the container as the ice cream and syrup flow into it in an unblended stream causes the syrup to assume a spiral pattern near the outer wall of the container, as indicated at S in FIG. 3. It is preferred to have the conduits 91 equally spaced radially of the dispenser to provide uniformity to the spiral pattern of the completed package, but the conduits may be spaced unequally to provide different spiral patterns.

The interior of the lower chamber has an inwardly extending annular shoulder forming a valve seat 92 just above the discharge outlet 71. A valve 93 is mounted on a plunger 94 which has its upper end connected to the cross bar 78. The valve 93 is shaped to seal the discharge outlet 71 of the nozzle 33 when it is seated on the valve seat 92. A conduit 95 leading into the lower chamber 90 is connected to a source of supply of the basic food product, such as ice cream. Means is provided to force the ice cream or other food product through the conduit by pressure. The conduit is flexible, or is provided with a flexible connection, to allow the dispenser to move vertically. A conduit 96 is connected to the upper chamber 89, and the second food product, such as syrup, is forced from a supply source into the upper chamber by pressure. The conduit 96 is similar to, but preferably smaller than the conduit 95.

When the container is moved upwardly into position to be filled, the valve 93 is moved upwardly, and the ice cream from the lower chamber and the syrup from the upper chamber are forced into the rapidly rotating container in four unblended streams. The ice cream stream is comparatively thick, and the streams of syrup are thin. The container is rotated constantly during the filling operation, and is lowered gradually as it is filled. The constant rotation and the downward movement of the container as it is being filled causes the syrup to assume a spiral pattern within the ice cream and near the outer periphery of the container which is made of transparent plastic. With three streams of syrup spaced equally radially of the axis of the plunger 94, the spirally arranged streams of syrup are equally spaced vertically from each other in the container.

At substantially the same instant that the container is filled to its capacity the sleeve 74 is raised abruptly by cam plates 82 to provide a clean break in the flow of the ice cream and syrup and thus prevent the contents of the downwardly moving container from pulling the ice cream and syrup below the valve of the discharge nozzle into the container. The clean break in the flow avoids forming a mound at the top of the ice cream in the container. The upward movement of the housing 72 is limited by a flange 97 secured to the plunger 94. Simultaneously with the upward movement of the housing 72 the valve 93 engages its seat 92 to close the discharge outlet 71 of the nozzle 33.

The discharge nozzles 33′ and 33″, shown in FIGS. 4 and 5, respectively, differ from the discharge nozzle shown in FIG. 2 in that in the embodiments of FIGS. 4 and 5 a separate cutoff is provided for the syrup. The different valve structure will be described, but the duplicate structure in each embodiment will be indicated by identical reference numerals, and the description of such structure will not be duplicated.

In FIG. 4, the upper section 98 of housing 72′ is divided into two vertically spaced annular chambers, an upper chamber 99 and an intermediate chamber 100 by an insert 101 having a vertical bore 102 in which the plunger 94′ is slidably mounted. The upper end of the upper section 98 has a flange 103 extending inwardly to fit tightly against the outer surface of the insert 101 and thus form the top of the upper annular chamber 99. An annular flange 104 extends outwardly from the insert 101 to the inner wall surface of the housing 72′ intermediate the length of the insert to form the bottom of the upper annular chamber 99 and the top of the intermediate annular chamber 100. The insert 101 has another lateral flange 105 forming the bottom of the intermediate annular chamber and the top of the lower chamber 90. A plurality of conduits 91, preferably three, extend through the lower flange 105 to permit the syrup to flow from the intermediate chamber 100 into the lower portion of the lower annular chamber 90 and thence through the discharge outlet 71 of the nozzle.

The vertical wall section of the insert 101 is provided with a plurality of apertures 106 interconnecting the upper annular chamber 99 with the vertical bore 102 and a plurality of apertures 107 interconnecting the intermediate annular chamber 100 with the bore 102. The section of the plunger 94′ below the flange 97 is constructed as a slide valve cooperating with the insert 101 to control the flow of one of the food products, such as, for example, the syrup. The plunger 94′ has an annular recess 108 between an upper O-ring 109 and a lower O- ring 110 each of which forms a seal between the plunger 94′ and the bore 102 of the insert 101. The vertical travel of the plunger within housing 72′ is so limited that both O-rings engage the inner wall surface of the insert 101 in all positions of the plunger.

The upper annular chamber 99, the apertures 106, the annular recess 108, the apertures 107, and the annular chamber 100 all constitute parts of the conduit that permits the syrup to flow from the source of supply to the end of the lower chamber 90 adjacent the discharge outlet. The annular recess 108 has a vertical dimension long enough to allow it to register with the apertures 106 and 107 at the same time, thus providing flow communication from the supply conduit 96 to the discharge conduit 91. When the plunger is in its lowermost position, in which the valve 93′ is seated on its seat 92′, the solid portion of the plunger above the recess 108 is in register with the apertures 106, and the conduit is closed to the flow of syrup.

When the container is in position to be filled, the plunger 94′ is raised to lift valve 93′ from its seat and to register recess 108 with both series of apertures 106 and 107. The valve 93′ and its seat 92′ may be identical with valve 93 and its seat 92, but in FIGS. 4 and 5 the valve has a resilient annular insert 111 of rubber or any suitable plastic material positioned to engage a sharp annular edge 92′ that forms a valve seat. With the plunger 94′ in its uppermost position, the syrup or other food product flowing under pressure in the conduit 96 flows into the upper annular chamber 99, through apertures 106, recess 108 and apertures 107 into the intermediate annular chamber 100. The syrup flows from the chamber 100 through the conduits 91, into the chamber 90, and out the nozzle 71 along with the ice cream or other food product as in the embodiment of FIG. 2.

When the container is filled and the housing 72′ is moved upwardly, as described in connection with the embodiment of FIG. 2, the plunger 94′ is in the position shown in FIG. 4. In this position the upper end of recess 108 is below the plane of apertures 106. The solid portion of the plunger 94′ cuts off the flow of syrup from conduit 96, since said syrup cannot pass through the apertures 106 into the recess 108.

In FIG. 5, the valve structure is similar to that shown in FIG. 4 except that the plunger 94″ is provided with a conduit 113 in the form of an axial bore extending upwardly through the valve 93″. A plurality of transverse apertures 114 extending through the wall of plunger 94″ lie below the apertures 106 when the plunger 94″ is in its lowermost position. When the plunger 94″ is raised, in the same manner as described in the embodiment of FIG. 2, the transverse apertures 114 move into axial register with the apertures 106 so that all parts of the conduit are in flow communication, and the syrup can flow from the conduit 96 through apertures 106 and 114 into conduit 113. The pressure flowing the syrup through conduit 96 will force the syrup through the nozzle 33″ as long as the apertures 106 and 114 remain in axial alignment. However, when the valve 93″ is on its seat 92′, the parts of the conduit are not in flow communication because the apertures 114 are not in register with the apertures 106, and the flow of syrup is effectively cut off.

The embodiment of FIG. 6 is similar to that of FIG. 5 except that the conduit 113 is replaced by a conduit 115 in the form of a vertical bore of larger diameter. A plug 116 fitted into the lower end of the conduit 115 has three conduits 117 extending therethrough to divide the flow of syrup from the conduit 115. The lower ends of the conduits 117 are flared outwardly, as indicated at 118, to direct the streams of syrup toward the outer edges of the container.

After a container has been filled, it is automatically moved to the cover applying station 24. At this station an open ended receptacle 119 holds a stack of flat, flanged covers 120 in vertical alignment, with each cover being arranged in position ready to be applied to a filled container. The receptacle 119 comprises three vertical rods 121 held in spatial relationship by horizontally extending bands 122. The covers are held in the receptacle 119, with their flanges extending upwardly, by spring pressed pins 123 projecting inwardly from screws 124 threaded through the rods 121 and held in place by nuts 125. As shown in FIG. 15, the spring pressed pins extend under the peripheral edge portions of the covers only a very short distance. Although the pins hold the covers securely in the receptacle 119, the pins may be retracted to permit removal of the covers from the receptacle by a slight downward pressure against the pins.

The mechanism for applying covers to the filled containers comprises a vertically disposed rectangular frame 126, as shown in FIG. 12. The frame 126 comprises two vertically disposed posts 127 each of which is slidably mounted in vertically aligned bushings 128 and 129. The bushings 128 are mounted in the top wall of housing 59, and the bushings 129 are mounted in the frame 21 of the machine. The lower ends of the posts are tied together by a cross bar 130 on which a cam roller 131 is rotatably mounted. Springs 132, each having one end secured to housing 59 and the opposite end secured to the bar 130, urge the bar downwardly to keep the cam roller in engagement with the peripheral surface of cam 63 which is fixed to drive shaft 60. A cross shaft 133 is rotatably mounted in apertures provided therefor in the upper ends of posts 127.

The cross shaft 133 is held against axial displacement of a pair of collars 134 fixed to the shaft on opposite sides of each post 127. A segmental pinion 135 is secured adjacent each end of shaft 133 and is held in place by another collar 136. Each pinion is provided with teeth 137 over a portion of its periphery, a flat peripheral surface 138 contiguous to one end of the toothed portion, and a similar flat peripheral surface 139 contiguous to the opposite end of the toothed portion. A vertically disposed rack 140 is fixed to the frame 21 adjacent opposite sides of the machine and extends upwardly into engagement with the peripheral surface of the adjacent pinion. Each rack has an upper flat surface 141, an intermediate toothed surface provided with teeth 142 adapted to mesh with the teeth 137, and a lower flat surface 143.

Rotation of the drive shaft 60 moves the frame 126 vertically in the upward direction by the action of cam 63 against the cam roller 131. The springs 132, assisted by the weight of the frame 126, move the frame downwardly whenever the cam 63 is in position to permit such movement. The entire movement of the frame 126 is vertical, but during the intermediate portion of the vertical movement of the frame, the teeth 137 of the segmental pinions engage the teeth 142 of the rack to rotate the cross shaft 133 through 180°. The flat surfaces 138 and 141 cooperate to prevent rotational movement of the cross shaft 133 adjacent the uppermost position of frame 126, and the flat surfaces 139 and 143 cooperate in the same manner adjacent the lowermost position of frame 126.

A plunger 144 extending through an aperture in the cross shaft 133 is slidable therein, and is held against separation therefrom by collars 145 and 146 fixed to the plunger on opposite sides of the cross shaft. A compression spring 147 encircling the plunger acts against the collar 146 to urge the plunger upwardly, when the parts are in the positions shown in FIG. 12. The upward movement of plunger 144, as viewed in FIG. 12, is limited by the engagement of collar 145 with the cross shaft 133. An open ended cylindrical member 148 has a reduced neck 149 fixed on the cross shaft 133. A suction cup 150, mounted on the upper end of plunger 144, has its upper edge projecting above the upper edge of the member 148 with its concave surface facing and in vertical alignment with the bottom cover 120 of the stack of flanged covers in the receptacle 119.

When the cam 63 moves the frame 126 upwardly from the position of FIG. 12, the suction cup 150 engages the lowermost cover of the stack of covers in receptacle 119 with sufficient force to secure it to the cover. The spring 147 absorbs the shock at the end of the upward movement of the frame 126. The continued rotation of cam 63 allows the springs 132 to pull the frame 126 downwardly, and the suction cup pulls the lowermost cover 120 downwardly past the spring pressed pins 123 to remove it from the stack. The flat surfaces 138 and 141 are long enough to prevent rotational movement of shaft 133 until after the lowermost cover has been moved downwardly far enough to clear the spring pressed pins 123. The teeth of the pinions and the racks engage each other after the lowermost cover clears the pins 123, and then rotate the shaft 133 through 180° to invert the cover 120 before the frame 126 completes its downward movement. The cover 120, with its flange extending downwardly, is then moved vertically downwardly just as a filled container 32 is moved into vertical alignment therewith.

The continued rotation of cam 63 moves frame 126 upwardly, and the cross shaft 133 lifts the plunger 144 and rotates it through 180° in the intermediate portion of the upward movement of the frame 126. During the final increment of upward movement of the frame 126, the suction cup 150 is in position to engage the lowermost cover 120 and to remove it from the receptacle 119.

As the cover is being positioned on top of the filled container, some air becomes entrapped between the upper edge of the container and the flange of the cover. The present invention includes means for freeing such entrapped air before the cover is secured to the container. In the preferred embodiment, the frame 21 has a flat plate 151 secured to it on each side of the conveyor 22 at the sealing station 25, as shown at 152, FIG. 16. The inner ends of plates 151 are spaced apart a distance less than the diameter of the portion of the container that is in the plane of the plates 151 as the container is seated in plate 29 for movement longitudinally of the machine. As the conveyor 22 moves each filled container from the cover applying station to the sealing station, each container must pass between the spaced inner ends of the pair of oppositely disposed plates 151.

Preferably the inner end of each plate 151 is rounded on one side, as indicated at 153, to facilitate entrance of each container into the space between the plates. As each container is moved between the plates 151, the plates engage opposite sides of the container near the upper edge thereof and squeeze them toward each other to form a path for the escape of any air trapped beneath the cover, as shown by the arrow in FIG. 19. While the container is stopped at the station 25 and the opposite sides are held deflected inwardly by the plates 151, plunger 165 under the control of cam 64 drops to press the cover towards the container, rising again before the conveyor starts and moves the container beyond the plates 151 to allow the inwardly deflected sides of the container to resume their normal position. Thus, the invention provides means for compressing the sides of the container while simultaneously pressing downward on the cover to provide for the escape of air trapped beneath the cover. A flange 154, extending laterally from the upper edge of the container, moves between the upstanding inner flange 155 of the cover and the underside of the top of the cover to lock the cover against accidental displacement of the cover from the container.

It may be noted that the method of excluding air from a package described above is not limited to a package of the type herein described, but may be used in packaging any material in a similar container.

In FIG. 21, a slightly different cover 156 is pressed against the upper edge of the container. The cover 156 has an inwardly extending flange 157 spaced from the top of the cover to allow space for an annular flange 158 projecting outwardly between the flange 157 and the top of the container.

Plunger 165 is controlled by the cam 64, as shown in FIG. 1. The plunger is mounted on a pin (not shown) depending from a cross bar 166. The cross bar 166 is secured to the upper ends of two vertically upstanding posts 167. The posts 167 are slidably mounted in the frame of the machine in the same manner as the posts 127 (FIG. 12). A compression spring 168 is interposed between the cross bar 166 and the plunger to cushion the shock as the plunger is moved into engagement with the cover 120. The mechanism for moving the cross bar 166 vertically is similar to that previously described for imparting vertical movement to the cross shaft 133 in FIG. 12, and the description will not be repeated.

As shown in FIG. 1 of the drawings, the sealing station 25 is separate and is spaced from the cover applying station 24 by an intervening idle station. However, if desired, the sealing station may be adjacent the cover applying station, and the plunger 165 may be supported by the vertically disposed frame 126 and operated by the cam 63 simultaneously with the vertical movement of said frame.

In FIGS. 17 and 18, a different mechanism moves the upper edge portion of the container out of its normal shape to allow escape of air trapped between the upper edge of the container and the flange of the cover. In this embodiment, the fixed plates 151 are replaced by laterally movable plates 169 and 170 that engage opposite sides of the container and press them inwardly. The plates 169 and 170 are moved laterally by a bell crank 171 pivotally mounted on a bracket 172 extending inwardly from one wall of housing 59. One arm 173 of the bell crank has a cam roller 174 engaged with cam 63 to move it pivotally in one direction. A spring 175 is secured to the housing 59 and the other arm 176 of the bell crank to pull the bell crank back to its original position whenever the shape of the cam 63 permits such movement. The plate 169 is secured to the upper end of the arm 176. The plate 170 is secured to the top of a lever 177 pivoted intermediate its length, as indicated at 178, and pivotally connected at its other end to a floating link 179. The link 179 is pivotally connected at its other end to the arm 176. The link connection between the bell crank 171 and the lever 177 causes the plate 170 to move inwardly when the plate 169 is moved inwardly, and outwardly when the plate 169 is moved outwardly.

In the embodiment of FIGS. 17 and 18, the mechanism of the sealing station is essentially the same as in the embodiment having fixed plates 151 except that the sides of the container are compressed by the movement of the plates 169 and 170. For convenience, the structure of the sealing station for the embodiment of FIGS. 17 and 18 is designated by the same reference numerals as the other embodiment except that they are primed.

Although I have described a preferred embodiment of my invention in considerable detail, it will be understood that the description thereof is intended to be illustrative, rather than restrictive, as many details of structure may be modified or changed without departing from the spirit or scope of the invention. Accordingly, I do not desire to be restricted to the exact details of structure disclosed.

What is claimed is:

1. An apparatus for packaging a product in a package, said package including an open-top container and a cover thereon, said container being of a type having a flexible side wall and said cover having a depending flange portion surrounding the upper region of said container side wall in sealing relation thereto, said apparatus including a filling station, a capping station and a venting station and an indexing conveyor having means for supporting said container and intermittently advancing and stopping said container at each of said stations in sequence, said filling station having means for substantially filling said container with a pressure flowable product, said capping station having means for applying and seating said cover on top of said container to locate said skirt portion in adjacent relation to the upper region of said container side wall with a limited air space existing between said cover and said product, and said venting station comprising means for freeing entrapped air before the cover is secured to the container, said last-named means having plate means engageable with said container while at said venting station for laterally inwardly deflecting at least one side wall region of said container to create a localized lateral clearance between said skirt portion and the upper region of said container side wall for the escape of air from said space, and plunger means operable while said lateral clearance is maintained by the plate means for pressing said cover towards said container.

2. In food packaging apparatus for seating a top cover upon an open-top container that has a flexible side wall, said cover having a depending flange portion surrounding the upper region of said container side wall in adjacent relation thereto and said container having a pressure flowable food product substantially filling the same with a limited air space existing between said cover and said food product, means for laterally inwardly deflecting at least one side wall region of said container to create a localized lateral clearance between said skirt portion and the upper region of said container side wall for the escape of air from said space including conveyor means for moving said container against stationary deflecting means, and plunger means operable while said lateral clearance is maintained by the first-named means for pressing said cover in a sense to shrink said air space and thereby force air to escape through said lateral clearance.

3. The arrangement of claim 2 in which said container is disengaged from said lateral inward deflection by said conveyor means in moving the container away from said stationary deflecting means.

4. The arrangement of claim 2 in which said stationary deflecting means comprises at least one fixed plate projecting into the path along which said container is moved by said conveyor means, whereby a side wall region of said container is deflected by said plate.

5. The arrangement of claim 2 in which said conveyor means operates intermittently in a relationship to stop and hold said container stationary against said deflecting means.

References Cited

UNITED STATES PATENTS

| | | | |
|---|---|---|---|
| 2,284,740 | 6/1942 | Huston | 53—367 |
| 2,329,311 | 9/1943 | Waters | 53—27 |
| 2,996,859 | 8/1961 | Winkler et al. | 53—282 X |

TRAVIS S. McGEHEE, Primary Examiner

U.S. Cl. X.R.

53—289, 300, 307